July 28, 1959

B. D. KUMPFER

MAGNETRON AMPLIFIER

Filed Aug. 29, 1955

2,897,401

INVENTOR.
BEVERLY DONALD KUMPFER

BY [signature]

ATTORNEY

United States Patent Office 2,897,401

Patented July 28, 1959

2,897,401

MAGNETRON AMPLIFIER

Beverly Donald Kumpfer, Spring Lake Heights, N.J., assignor to the United States of America as represented by the Secretary of the Army Application August 29, 1955, Serial No. 531,303

3 Claims. (Cl. 315—39.63)

(Granted under Title 35, U.S. Code (1952), sec. 266)

The invention described herein may be manufactured and used by or for the Government for governmental purposes, without the payment of any royalty thereon.

This invention relates to microwave amplifiers and more particularly to magnetron type microwave amplifiers.

In most pulsed radar applications it is often required to provide efficient microwave amplifiers having adequate gain and isolation. This is especially true in applications of high power MTI radar systems where pulse-to-pulse phase coherence is necessary. Traveling wave tube amplifiers of both beam and magnetron types now being used do not have sufficient gain to permit high pulsed power to be derived from a continuous wave source without the use of many intermediate stages, a factor which greatly multiplies the complexity and prevents frequency diversity. An even more serious drawback to these devices in such applications is the poor isolation between the input and output terminals. This results in an impedance change in the output load which is reflected into the driven source with resultant frequency instability if the source is an oscillator. Isolation can be improved by introduction of lossy material, but only at the sacrifice of gain. Although the klystron type amplifier provides good gain and good isolation in pulse technique, it has the serious disadvantage that it is a very high impedance device so that excessively high voltages are required for its operation. Other disadvantages of the klystron type amplifier now in use are low efficiency and the complexity of gang tuning where multi-cavity klystrons are employed.

One magnetron type amplifier adapted to overcome the aforesaid limitations is described in Patent No. 2,509,419, issued May 30, 1950. This magnetron amplifier comprises axially aligned primary and secondary cavity resonators which encompass an axial cathode and are separated by a metallic disk shield. The input radio-frequency energy is coupled into the primary resonator and the amplified output energy is coupled out of the secondary resonator. To prevent self-oscillation in both the primary and secondary resonators discrete cylindrical electrodes are positioned intermediate the cathode and the vane tips of the respective resonators and distinct D.-C. potentials are applied thereto. The cylindrical electrode within the primary resonator functions as a repeller electrode wherein the applied D.-C. potential provides an axial electron drift while the cylindrical electrode within the secondary resonator is biased to function as a collector electrode. In such a device, the electrons from the input primary resonator will drift axially into the output secondary resonator even when no radio-frequency signal is applied to the input resonator thereby enhancing the possibility of self-oscillation. Furthermore, the method used to prevent such self-oscillation will also greatly reduce the efficiency of amplification or preclude it entirely.

It is therefore an object of the present invention to provide an improved magnetron type amplifier wherein the aforesaid limitations are overcome.

It is another object of the present invention to provide an improved magnetron type amplifier adapted for pulse operation and having relatively high efficiency, high gain, and excellent isolation between input and output.

It is another object of the present invention to provide an improved magnetron type amplifier wherein the possibility of self-oscillation in both the input and output resonators is precluded.

It is yet another object of the invention to provide an improved magnetron amplifier which may be readily adapted for frequency multiplication.

In accordance with the present invention the magnetron amplifier includes an anode structure which comprises axially aligned input and output cavity resonators each having interiorly extending radially disposed anode members. Also included is a cathode coaxially arranged with and radially spaced from the cavity resonators and electron emissive only within the input resonator. The anode members of the input cavity resonator are constructed so that the ends thereof facing the cathode emissive portion are slanted uniformly at a prescribed angle with respect to the axis of the cathode. Additionally there are included means for establishing discrete electric fields between the cathode and each of the resonators and means adjacent the cathode and the anode structure for establishing a magnetic field common to both resonators and perpendicular to the electric fields. Included further are means for introducing high-frequency radio energy into the input resonator for producing between the ends of the slanted anode members and the cathode a spoked rotating electron space charge having an axial motion whereby the rotating space charge is injected into the output resonator to excite the output resonator into amplified oscillations, and means coupled to the output resonator for extracting therefrom the amplified high-frequency energy.

For a better understanding of the invention, together with other and further objects thereof, reference is had to the following description taken in connection with the accompanying drawing in which.

Figure 1:
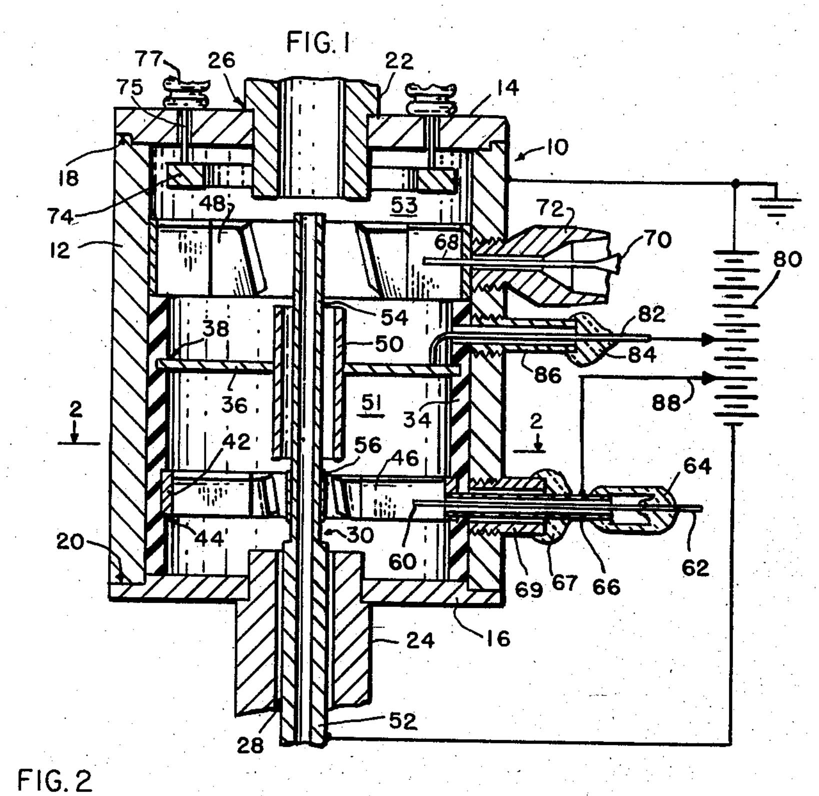
Figure 1 is a longitudinal sectional view taken substantially through the center of the magnetron amplifier.
Figure 2:
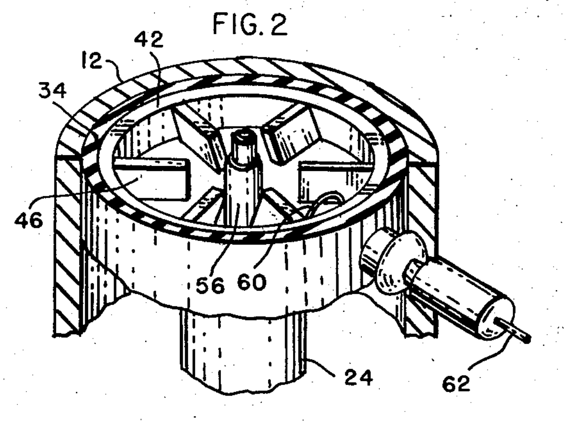
Figure 2 is a perspective sectional view taken along line 2—2 of Figure 1.
Figure 3:
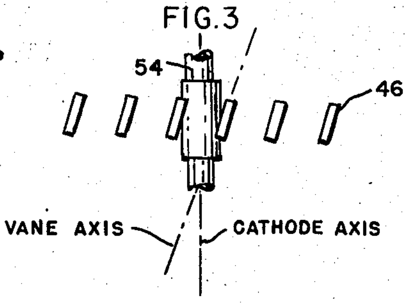
Figure 3 is an illustrative diagram having the relationship between the input anode vane type and the cathode shown in Figure 1.

Referring now to Figures 1–3 of the drawing, there is shown at 10 a magnetron type structure including a cylindrical member 12 made of highly conductive material, such as copper, having its ends closed by means of respective end plates 14 and 16 which are hermetically sealed respectively to the walls of cylindrical members 12 as at 18 and 20. Each of the end plates is provided with a central aperture through which tubular magnetic pole pieces 22 and 24 respectively extend to provide the conventional axial magnetic field. The pole pieces are hermetically sealed in their respective end plates as at 26 and pole piece 24 is provided with a central bore 28 through which there is extended a cathode structure 30 coaxial with cylindrical member 12. Affixed to the inner surface of cylindrical member 12 is a tubular insulating member 34, made of ceramic or the like, which extends upwardly from end plate 16 a distance slightly greater than one-half the length of cylindrical member 12. The cylindrical member 12 is divided equally into two anode sections by means of a centrally apertured metallic disk 36 supported in a recessed portion 38 provided therefor in insulating member 34.

Intermediate disk 36 and end plate 16 there is provided a ring 42 of conductive material, such as copper coaxial with cylindrical member 12 and supported in a recessed portion 44 provided therefor in insulating member 34. Ring 42 is provided with a multiplicity, herein shown as six, of anode members preferably in the form of interiorly extending radially disposed vanes 46 which are slanted uniformly in the same direction at a prescribed angle with respect to the axis of cathode 30. The relative position of the vane tips with respect to the axis of cathode 30 is illustrated in Figure 3. The prescribed angle of slant may range between a minimum of 20 degrees and a maximum of 45 degrees. The upper section of cylindrical member 12 is also provided with a like number of anode members in the form of radially disposed vanes 48 which extend inwardly from the inner surface of the cylindrical member 12. The radial length of the vanes 48 is made shorter than the radial length of the vanes 46 but the axial dimension or width of the vanes 48 is made greater than the axial dimension of the vanes 46. Thus the diameter of the anode formed by vanes 48 is made greater than the diameter of the anode formed by the vanes 46. As will hereinbelow be explained, it is preferable to slant the vanes 48 in the same direction at the same angle with respect to the axis of cathode 30 as are the vane members 46. The disk 36 is provided with a cylindrical section 50 secured to the central aperture thereof having its ends in close spaced relationship to the vanes 46 and 48 and having a diameter equal to the diameter of the anode formed by vanes 46. In the arrangement hereinabove described, the disk 36 acts as a shield to divide the magnetron into two cavity resonators. The cavity resonator formed by the ring 42 and vanes 46 will hereinafter be referred to as input cavity resonator 51 while the cavity resonator formed by vanes 48 and cylindrical member 12 will hereinafter be referred to as the output cavity resonator 53. It is to be noted that the disk 36 and input cavity resonator 51 are electrically insulated from cylindrical member 12 and output cavity resonator 53.

Cathode structure 30 includes a cathode sleeve 52 made of nickel or the like, provided with a reduced portion 54 which extends through input cavity resonator 51, through cylindrical section 50 and through output cavity resonator 53 to a point slightly beyond the upper surface of the vanes 48. Thus cylindrical section 50 provides an annular passage about the cathode structure between the input and output cavity resonators. Suitable sealing and insulation means (not shown) may be provided in the usual manner to support cathode member 30 in position within pole piece 24 and maintain an evacuated structure. The portion of reduced cathode 54 facing the slanted tips of vanes 46 is coated with an electron emissive material as at 56. It has been found that by slanting the vane tips with respect to the axis of the cathode, self-oscillation in the input resonator is greatly suppressed and as hereinbelow described, the D.-C. energy in the input cavity resonator is converted to radio-frequency energy only when an R-F input signal is applied thereto.

An input radio-frequency signal is coupled into input resonator 51 by means of a loop 60 which extends into the space defined by any two of the vanes 46. Loop 60 is connected to a conductor 62 entering the device through a glass seal 64 fused into a pipe 66 which extends through and is affixed to ring 42. Pipe 66 in turn passes through glass seal 67 fused into a pipe 69 which encompasses pipe 66 and is radially spaced therefrom. Pipe 69 extends through the wall of cylindrical member 12 and terminates in insulating member 34. In order to extract output power from output resonator 53 there is provided a similar loop 68 which extends into the space defined by any two of the vanes 48 of said output resonator. Loop 68 is connected to a conductor 70 supported in a suitable glass seal (not shown) fused into a pipe 72 which is threaded and hermetically sealed into cylindrical member 12. A conventional tuning ring 74 supported in position by means of rods 75 and bellows 77 is provided between the top of vanes 48 and end plate 14 for adjusting the frequency of output resonator 53 to that of input resonator 51. Suitable means for axially actuating rods 75 (not shown) for positioning tuning ring 74 relative to vanes 49 may be provided in the conventional manner. It is to be understood of course that similar tuning means may be provided for input resonator 51 so that both resonators may be tuned to the required frequency. Discrete direct-current electric fields are applied respectively between cathode 30 and output resonator 53, input resonator 51 and disk 36 by means of D.-C. source 80. The output resonator 53 is at a higher D.-C. potential than that of input resonator 51. Although disk 36 may be at the same D.-C. potential as input resonator 51 it is preferred to maintain it at a slightly higher D.-C. potential. The D.-C. potential is applied to disk 36 by means of lead-in conductor 82 which passes out of the device through insulation 34 and the wall of cylindrical member 12 and is supported in glass seal 84 fused into a pipe 86 which is threaded and hermetically sealed into cylindrical member 12. The D.-C. potential is applied to input resonator 51 through lead 88 which is connected to pipe 66.

In discussing the operation of the invention, let it be assumed first that no input radio-frequency signal is applied through coupling loop 60. With no radio-frequency input, the only potential acting on the electrons emitted from coated source 56 is the applied D.-C. potential from source 80 which may be represented as a radial vector perpendicular to the axis of cathode 30. As an added precaution against self-oscillation, the D.-C. potential applied to input resonator 51 may be adjusted just below the value where oscillations will occur, so that when a radio-frequency signal is applied thereto the added voltage will supplement the D.-C. potential to produce oscillatory energy. Now, with a sinusoidally varying radio frequency applied to input resonator 51 through coupling loop 60, there is produced a fringing radio-frequency field superimposed on the D.-C. field, which due to the angular slant of the type of vanes 46, will provide an axial sorting of the electrons in accordance with their phase. For the opposing radio-frequency field the axial slanting of the vanes 46 will cause electrons which cross a single resonator cavity formed by two adjacent vanes to be deflected upward and, for an aiding radio-frequency field, the electrons will be caused to be deflected downwards. Thus an axial sorting mechanism is provided which will project the in-phase energy contributing electrons upward and the out-of-phase electrons downward. If the anode vanes 46 are relatively short in the axial direction, the electrons opposed to the radio-frequency field will produce a spoked, rotating electron space charge which is ejected axially from the top of the anode vanes 46. Electrons which absorb energy from the input radio-frequency energy will provide the usual back bombardment and hence enhance emission. However, such back-bombardment may take place outside the interaction space.

The rotating spoked electron cloud is deflected upward and injected into output resonator 53 through disk cylinder 50 wherein the D.-C. field from source 80 maintains the rotation of the injected electrons at the proper angular velocity between input and output resonators. As the rotating charge passes the ends of vanes 48, it delivers energy to output cavity-resonator 53 and excites it into amplified oscillation. As hereinabove described, output resonator 53 has the same number of vanes as input resonator 51 but is of larger dimensions in the axial direction, and since the applied magnetic field is the same for both resonators, a higher D.-C. potential must be applied to the output resonator to maintain synchronous angular velocity. Since the operating voltage for this velocity increases as the square of the anode diameter, much higher power than the input radio-frequency power can be extracted from the spoked electron space charge in output resonator 53. Thus, the synchronous cloud injected into output resonator 53 will maintain the same angular velocity as that in the input resonator 51 but will be increased in diameter and the increased power output will result from the higher D.-C. voltage applied to the output resonator. The energy is coupled out of output resonator 53 through coupling loop 68. It is to be noted of course that the interaction space of output resonator 53 can receive no electrons for conversion until there is provided a radio-frequency input signal from loop 60 to provide proper axial sorting and injection.

Due to the slant of the input anode vanes 46, the spokes of the electron space charge injected into output resonator 53 are also slanted so that it is preferable to slant the tips of output resonator vanes 48 in the same direction as the input resonator vanes 46 to provide most efficient interaction. The electrostatic shield 36 prevents the pulling of electrons from the input resonator 51 to the output resonator 53. For most efficient operation disk 36 should be operated at the same D.-C. potential as input resonator 51 or at a slightly higher D.-C. potential, so that synchronous electron velocity may be maintained within input resonator 51 until the electrons are injected or launched into output resonator 53. The overall effect is that of having a cathode in the output resonator 53 which emits only pre-bunched synchronous electrons when excited by an R-F input signal of the same frequency. The amplifier is completely electron coupled so that load impedance changes are isolated from the driving source. The gain is expected to be very high since very little input power is required to sort the electrons. Ideally, the input section would draw very little current since electrons would be deflected out of the interaction space of input resonator 51 before reaching the anode thereof. Self-oscillation in the input resonator 51 would be prevented by this same mechanism since an electron which interacts favorably would be axially ejected. Self-oscillation may further be prevented by using a cathode-anode radius which markedly departs from $$\frac{r_a}{r_c}=\frac{N+4}{N-4} \quad (N=\text{number of resonators})$$

thus making the starting current high.

Although the invention has been described in connection with a vane type of magnetron it is to be understood that it is not limited to such structures. For example, cavity resonators 51 and 53 may comprise the slot-and-hole type or interdigital type structure with the tips or ends of the resonator structure tilted as described hereinabove. Moreover, it is to be noted that the structure of Figure 1 may readily function as a frequency multiplier by merely increasing the number of vanes in the output resonator in accordance with the frequency multiplication desired. For example, if frequency doubling were desired for a six-vane input magnetron twelve vanes would be required in the output resonator.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A magnetron amplifier comprising an anode structure including axially aligned input and output cavity resonators, each having an equal number of interiorly extending radially disposed anode members, a cathode coaxial with said cavity resonators and spaced therefrom and electron emissive only within said input resonator, the input resonator anode members being uniformly slanted at a prescribed angle of not less than 20 degrees nor more than 45 degrees with respect to the cathode axis, the end surfaces of each of said input resonator anode members facing said cathode emissive portion being uniformly spaced from the cathode axis, means for establishing discrete electric fields between said cathode and each of said resonators, means adjacent said cathode and said anode structure for establishing a magnetic field common to both resonators and perpendicular to said electric fields, means for introducing high-frequency radio energy into said input resonator for producing between the ends of said slanted anode members and said cathode a spoked rotating electron space charge having an axial motion whereby said rotating space charge is injected into said output resonator to excite said output resonator into amplified oscillations at said high-frequency energy, and means coupled to said output resonator for extracting therefrom said amplified high-frequency energy.

2. The magnetron in accordance with claim 1 wherein the anode members of both said input and output resonators are slanted at the same angle and in the same direction with respect to the axis of said cathode.

3. The magnetron in accordance with claim 1 wherein the radial dimension of the anode members of said input cavity resonator is greater than the radial dimension of the anode member of said output cavity resonator, and the width dimension of the output cavity resonator anode members is greater than the width dimension of the input cavity resonator anode members, said width dimension being measured along said cathode axis.

References Cited in the file of this patent

UNITED STATES PATENTS

| | | |
|---|---|---|
| 2,412,372 | Usselman | Dec. 10, 1946 |
| 2,496,500 | Spencer | Feb. 7, 1950 |
| 2,508,280 | Ludi | May 16, 1950 |
| 2,509,419 | Brown | May 30, 1950 |
| 2,626,372 | Spencer | Jan. 20, 1953 |
| 2,633,556 | Kumpfer | Mar. 31, 1953 |